(12) United States Patent  (10) Patent No.: US 9,250,310 B2
Hasegawa  (45) Date of Patent: Feb. 2, 2016

(54) METHOD OF POSITIONING MOBILE TERMINAL AND MOBILE TERMINAL

(71) Applicant: FUJITSU LIMITED, Kawasaki-shi, Kanagawa (JP)

(72) Inventor: Eiji Hasegawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 147 days.

(21) Appl. No.: 13/936,837

(22) Filed: Jul. 8, 2013

(65) Prior Publication Data

US 2014/0057656 A1  Feb. 27, 2014

(30) Foreign Application Priority Data

Aug. 24, 2012 (JP) .................................. 2012-184745

(51) Int. Cl.
  *G01S 5/02* (2010.01)
  *G01S 19/48* (2010.01)
  *G01S 19/34* (2010.01)

(52) U.S. Cl.
  CPC ................ *G01S 5/02* (2013.01); *G01S 5/0263* (2013.01); *G01S 19/48* (2013.01); *G01S 19/34* (2013.01)

(58) Field of Classification Search
  CPC ....... H04W 4/02; H04W 4/023; H04W 4/021; H04W 4/028; H04W 4/025; H04W 64/003; G01S 5/02; G01S 19/06; G01S 19/34; G01S 19/48; G01S 5/0263
  USPC .................................. 455/456.1, 456.2, 456.3
  See application file for complete search history.

(56) References Cited

U.S. PATENT DOCUMENTS

2004/0267840 A1* 12/2004 Ono .............................. 708/200
2006/0284765 A1* 12/2006 Bernhardt et al. ........ 342/357.09
2013/0093627 A1*  4/2013 Cosman ........................ 342/451

FOREIGN PATENT DOCUMENTS

JP  2002-150489  5/2002
JP  2007-139515  6/2007
JP  2012-21851   2/2012

* cited by examiner

*Primary Examiner* — Magdi Elhag
(74) *Attorney, Agent, or Firm* — Staas & Halsey LLP

(57) ABSTRACT

A method of positioning a mobile terminal includes obtaining first accuracy information on acquisition of position information using a first method, obtaining second accuracy information on acquisition of position information using a second method when a displacement of the mobile terminal exceeds a predetermined distance, and selecting the first method or the second method to obtain position information after movement of the predetermined distance based on the first accuracy information and the second accuracy information.

14 Claims, 16 Drawing Sheets

FIG. 7

| POSITIONING METHOD | DISTANCE THRESHOLD VALUE |
|---|---|
| GPS POSITIONING | 100m |
| WLAN POSITIONING | 100m |
| BASE STATION POSITIONING | 500m |

T3

METHOD OF POSITIONING MOBILE TERMINAL AND MOBILE TERMINAL

CROSS-REFERENCE TO RELATED APPLICATION

This application is based upon and claims the benefit of priority from the prior Japanese Patent Application No. 2012-184745 filed on Aug. 24, 2012, the entire contents of which are incorporated herein by reference.

FIELD

The embodiments discussed herein are related to a method of positioning a mobile terminal, a medium for storing a control program, and a mobile terminal.

BACKGROUND

In recent years, mobile terminals supporting a plurality of positioning methods, such as GPS positioning, WLAN positioning, and base station positioning have been developed. Positional services utilizing these mobile terminals are also being widespread.

In positional services, it is important to obtain accurate position information of a mobile terminal. Accordingly, for example, a proposal has been made of a mobile terminal in which positioning is carried out by all the positioning methods supported by a mobile terminal in response to a positioning request from an application, and only position information obtained by a positioning method with a maximum positioning accuracy is used among all the positioning methods.

However, in a mobile terminal according to a related-art technique, even if positioning is carried out by all the positioning methods, position information that is actually used is only position information by a positioning method that has attained a maximum positioning accuracy. That is to say, if positioning by all the positioning methods is carried out, accurate position information of the mobile terminal is certainly obtained. However, positioning is also operated in order to obtain position information that is not actually used for every positioning request from an application, and thus power consumption of the mobile terminal increases.

Related-art techniques have been disclosed in Japanese National Publication of International Patent Application No. 2011-520131 and Japanese Laid-open Patent Publication Nos. 2009-092506 and 2012-021851.

SUMMARY

According to an aspect of the invention, a method of positioning a mobile terminal includes obtaining first accuracy information on acquisition of position information using a first method, obtaining second accuracy information on acquisition of position information using a second method when a displacement of the mobile terminal exceeds a predetermined distance, and selecting the first method or the second method to obtain position information after movement of the predetermined distance based on the first accuracy information and the second accuracy information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a schematic diagram of a distance threshold value table according to the first embodiment;

DESCRIPTION OF EMBODIMENTS

First Embodiment

In the following, a description will be given of a first embodiment with reference to FIGS. 1 to 10.

Positioning System

Figure 1:
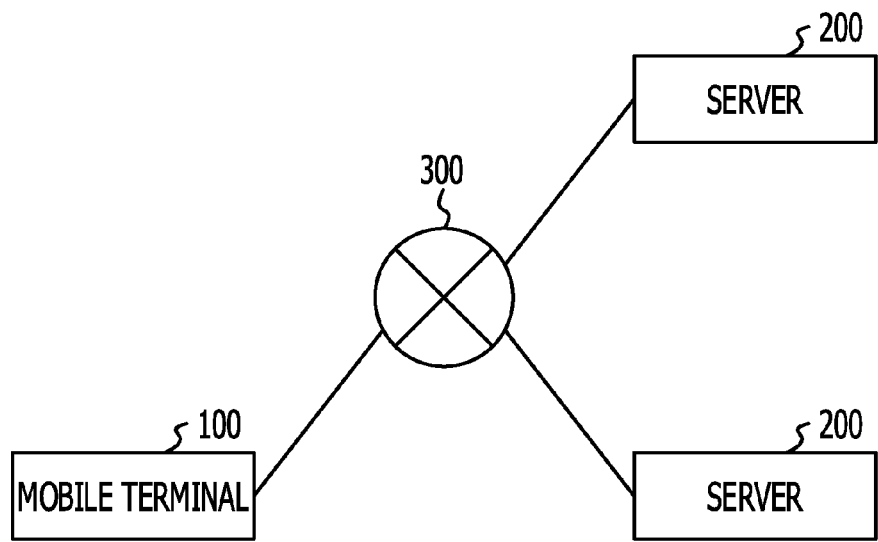
FIG. 1 is a schematic diagram of a positioning system according to a first embodiment.

FIG. 1 is a schematic diagram of a positioning system according to the first embodiment.

As illustrated in FIG. 1, the positioning system according to the present embodiment includes a mobile terminal 100 and servers 200. The mobile terminal 100 and the servers 200 are mutually connected through a network 300.

Mobile Terminal 100

A description will be given of the mobile terminal 100 according to the first embodiment. Here, it is assumed that Android (registered trademark) is employed as an operating system (OS) installed on the mobile terminal 100. Android includes an OS kernel and an application framework/library, and a control program according to the present embodiment is incorporated in the application framework/library. However, the mode of present disclosure is not limited to this, and an OS other than Android may be employed. Further, the control program according to the present embodiment may be incorporated in a software component other than the application framework/library.

Hardware of Mobile Terminal 100

Figure 2:
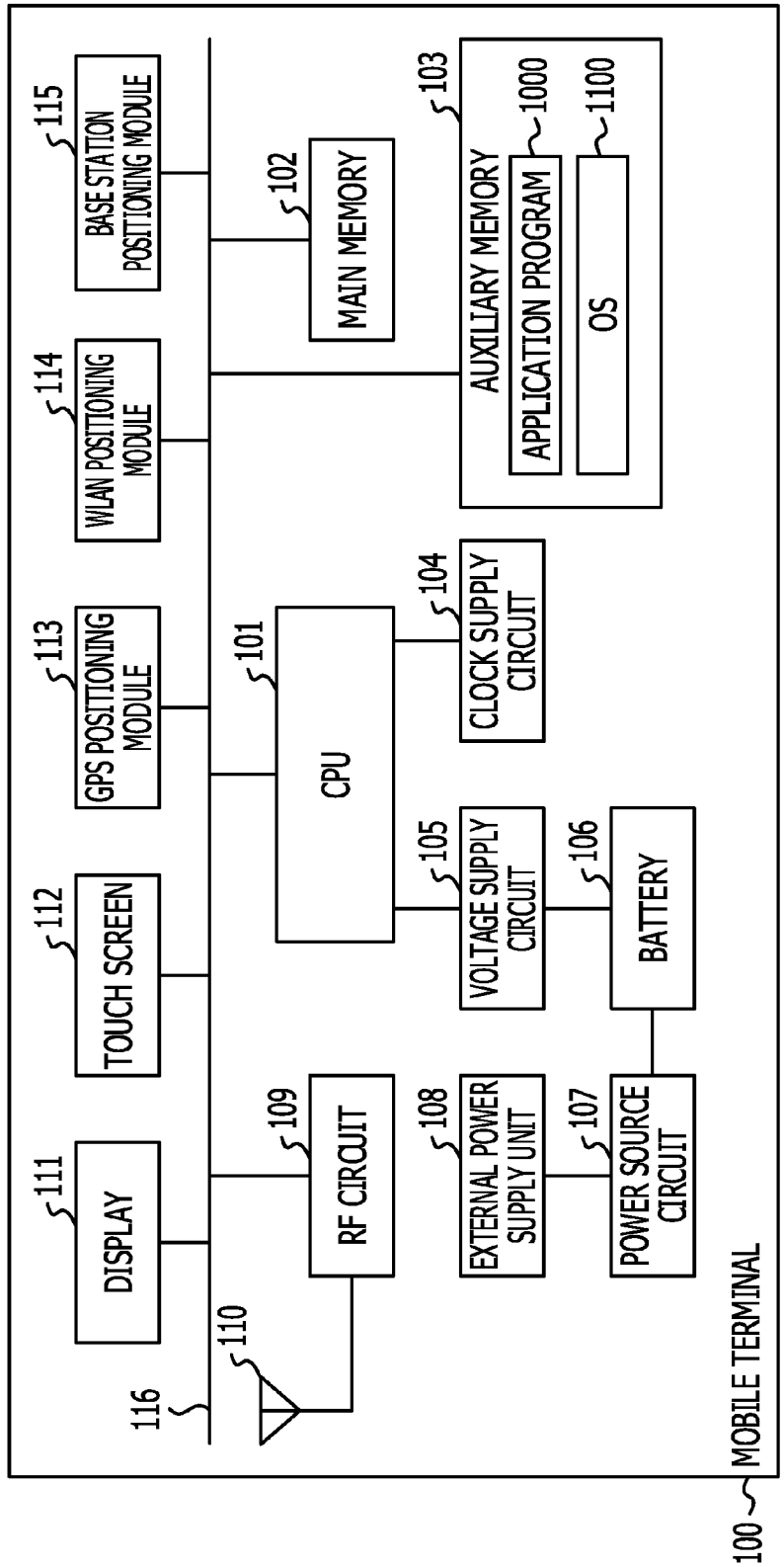
FIG. 2 is a schematic diagram of a hardware configuration of a mobile terminal according to the first embodiment.

FIG. 2 is a schematic diagram of a hardware configuration of the mobile terminal 100 according to the first embodiment.

In the present embodiment, a mobile information terminal, such as a smart phone, a tablet PC, for example, are assumed to be the mobile terminal 100.

As illustrated in FIG. 2, the mobile terminal 100 according to the present embodiment includes a central processing unit (CPU) 101, a main memory 102, an auxiliary memory 103, a clock supply circuit 104, a voltage supply circuit 105, a battery 106, a power source circuit 107, an external power supply unit 108, a radio frequency (RF) circuit 109, an antenna 110, a display 111, a touch screen 112, a global positioning system (GPS) positioning module 113, a wireless local area network (WLAN) positioning module 114, and a base station positioning module 115 as hardware modules. These hardware modules are mutually connected through a bus 116.

The CPU 101 is operated by a clock signal supplied from the clock supply circuit 104 and a voltage supplied from the voltage supply circuit 105, and controls various hardware modules of the mobile terminal 100. Further, the CPU 101 reads various programs stored in the auxiliary memory 103 in the main memory 102, and executes the various programs transferred to the main memory 102 so as to achieve various functions. A detailed description will be given of the various functions later.

The main memory 102 stores the various programs performed by the CPU 101. Further, the main memory 102 is used as a work area of the CPU 101, and stores various kinds of data that are used for processing by the CPU 101. As for the main memory 102, for example, a random access memory (RAM) may be used.

The auxiliary memory 103 stores various programs that operate the mobile terminal 100. The various programs include, for example, an application program 1000 that is executed by the mobile terminal 100, and an OS 1100, which is an execution environment of the application program 1000. The control program according to the present embodiment is also stored in the auxiliary memory 103. The control program is incorporated in the application framework/library of Android. For the auxiliary memory 103, for example, a non-volatile memory, such as a hard disk and a flash memory may be used.

The clock supply circuit 104 generates a clock signal to be supplied to the CPU 101. The clock supply circuit 104 may be achieved, for example, by a quartz oscillator that oscillates a clock signal, and a real time clock (RTC).

The voltage supply circuit 105 generates a variable voltage to be supplied to the CPU 101 on the basis of electric power supplied from the power source circuit 107. The voltage supply circuit 105 may be achieved by a voltage detector and a voltage regulator.

The battery 106 supplies electric power to the power source circuit 107. The battery 106 may be achieved by a battery, for example, a lithium-ion battery, and a battery protection integrated circuit (IC).

The power source circuit 107 supplies electric power supplied from the battery 106 to the various hardware modules of the mobile terminal 100 through power source lines (not illustrated in FIG. 2). In this regard, in the case where an external power source (not illustrated in FIG. 2) is connected to the external power supply unit 108, the power source circuit 107 may supply electric power supplied from the external power supply unit 108 to the various hardware modules of the mobile terminal 100. The power source circuit 107 may be achieved by a switching regulator and a voltage regulator, for example.

The RF circuit 109 transmits a high-frequency signal from the antenna 110 to the other radio communication apparatuses under the control of the CPU 101. Further, the RF circuit 109 converts a high-frequency signal received by the antenna 110 into a baseband signal, and outputs the baseband signal to the CPU 101.

The display 111 displays image information to be presented to a user under the control of the CPU 101. The touch screen 112 is attached to the display 111, and receives position information input by a fingertip of the user, a pen tip, and so on. In the present embodiment, the touch screen 112 is used as a position input device for user's operation.

The GPS positioning module 113 receives radio waves transmitted from a plurality of artificial satellites under the control of the CPU 101. The radio waves from the artificial satellites include identification information of the individual artificial satellites and time information.

The WLAN positioning module 114 receives radio waves transmitted from a plurality of access points of a wireless local area network (LAN) under the control of the CPU 101. Further, the WLAN positioning module 114 transmits the individual MAC addresses (identification information) of the access points.

The base station positioning module 115 receives radio waves transmitted from base stations of third generation (3G) or long term evolution (LTE). Further, the base station positioning module 115 transmits the individual cell IDs of the base stations.

Further, the mobile terminal 100 according to the present embodiment may include, for example, an acceleration sensor, a gyro sensor, an illuminance sensor, a geomagnetic sensor, a tilt sensor, a pressure sensor, a proximity sensor, and a temperature sensor.

Functional Blocks of Mobile Terminal 100

Figure 3:
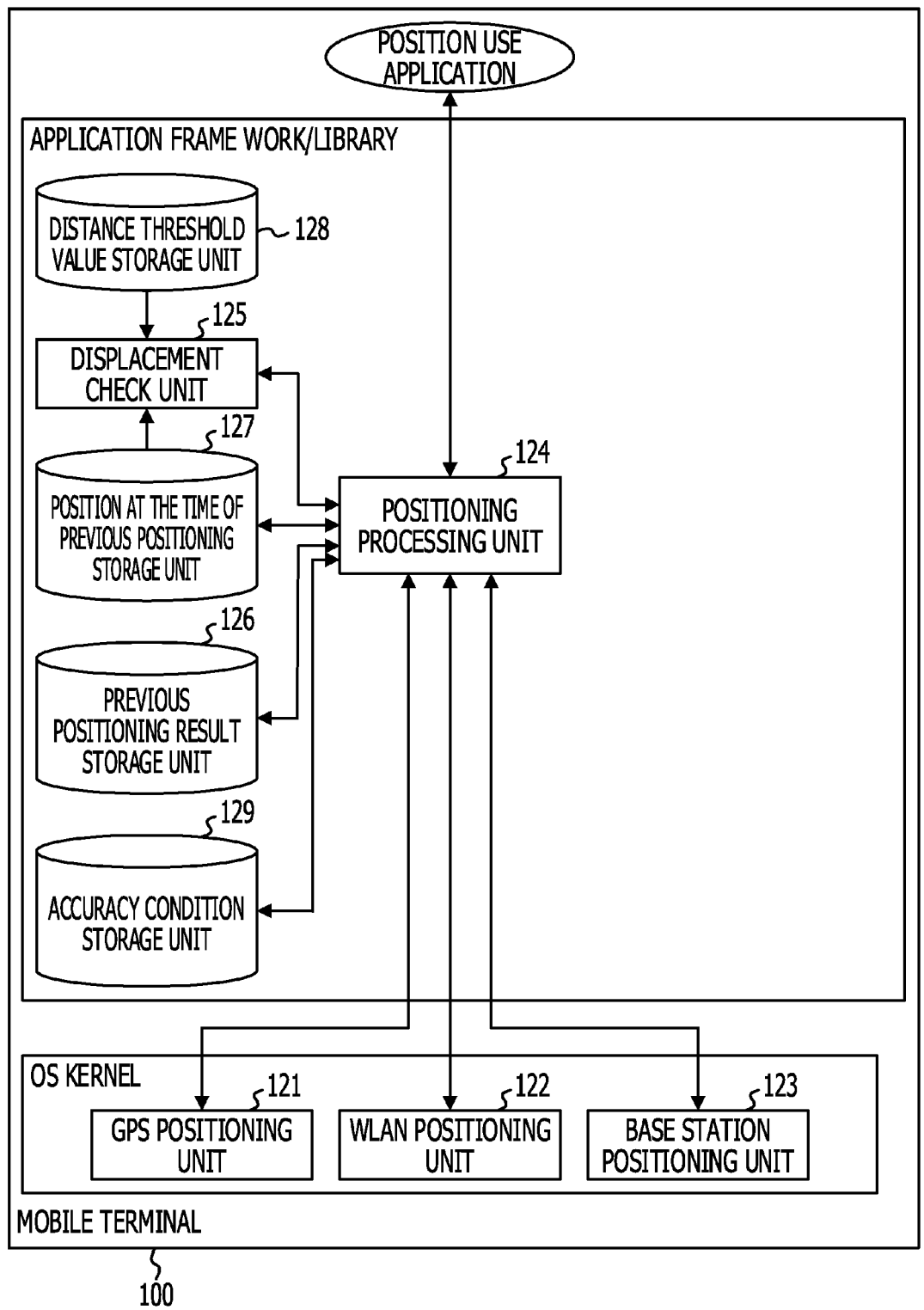
FIG. 3 is a schematic diagram of functional blocks of the mobile terminal according to the first embodiment.

FIG. 3 is a schematic diagram of functional blocks of the mobile terminal 100 according to the first embodiment.

As illustrated in FIG. 3, the mobile terminal 100 according to the present embodiment includes a GPS positioning unit 121, a WLAN positioning unit 122, a base station positioning unit 123, a positioning processing unit 124, a displacement check unit 125, a previous positioning result storage unit 126, a position at the time of previous positioning storage unit 127, a distance threshold value storage unit 128, and an accuracy condition storage unit 129.

OS Kernel

All of the GPS positioning unit 121, the WLAN positioning unit 122, and the base station positioning unit 123 are achieved when the CPU 101 reads an OS kernel in the main memory 102, and the OS kernel that has been transferred to the main memory 102 is executed.

GPS Positioning Unit 121

The GPS positioning unit 121 controls the GPS positioning module 113 to perform GPS positioning on the basis of an instruction from the positioning processing unit 124. Specifically, the GPS positioning unit 121 starts reception of radio waves (GPS signals) transmitted from artificial satellites (GPS satellites) in response to an instruction from the positioning processing unit 124. Further, the GPS positioning unit 121 calculates position information of the mobile terminal 100 and positioning accuracy (accuracy information) on the basis of identification numbers (identification information) of the GPS satellites included in the GPS signals, transmission time (time information) of the GPS signals, and so on.

WLAN Positioning Unit 122

The WLAN positioning unit 122 controls the WLAN positioning module 114 to perform WLAN positioning on the basis of an instruction from the positioning processing unit 124. Specifically, the WLAN positioning unit 122 starts reception of radio waves transmitted from an access point of the wireless LAN in response to an instruction from the positioning processing unit 124. Further, the WLAN positioning unit 122 obtains a MAC address of the access point, and so on from radio waves transmitted from the access point, and transmits the MAC address to an external server. And the WLAN positioning unit 122 obtains position information of the mobile terminal 100 and positioning accuracy that are returned from the external server. However, the WLAN positioning unit 122 may calculate the position information and the positioning accuracy of the mobile terminal 100 on the basis of the intensity of the radio waves transmitted from the access point and the MAC address of the access point, and so on.

Base Station Positioning Unit 123

The base station positioning unit 123 controls the base station positioning module 115 to perform base station positioning on the basis of an instruction from the positioning processing unit 124. Specifically, the base station positioning unit 123 starts reception of radio waves transmitted from, for example, a 3G or LTE base station in response to an instruction from the positioning processing unit 124. Further, the base station positioning unit 123 obtains a cell ID, and so on from radio waves transmitted from the base station, and transmits the cell ID, and so on, to the external server. The base station positioning unit 123 obtains the position information of the mobile terminal 100 and the positioning accuracy that are returned from the external server. However, the base station positioning unit 123 may calculate the position information of the mobile terminal 100 and the positioning accuracy on the basis of the intensity of the radio wave transmitted from the base station, and the cell ID and so on, of the base station.

Application Framework/Library

All of the positioning processing unit 124, the displacement check unit 125, the previous positioning result storage unit 126, the position at the time of previous positioning storage unit 127, the distance threshold value storage unit 128, and the accuracy condition storage unit 129 are achieved when the CPU 101 transfers the control program to the main memory 102, and the control program that has been read in the main memory 102 is executed.

Positioning Processing Unit 124

The positioning processing unit 124 selects a positioning method by which a maximum positioning accuracy is recorded among positioning methods recorded in a previous positioning result table T1 in response to, for example, a trigger of a positioning request issued by a position use application, and records "1" in the positioning flag of a positioning execution table Ta. Further, the positioning processing unit 124 refers to the positioning flag of the positioning execution table Ta, and instructs at least one of the GPS positioning unit 121, the WLAN positioning unit 122, and the base station positioning unit 123 to execute positioning.

In this regard, the position use application issues requested accuracy in addition to the positioning request. The requested accuracy is a condition on positioning accuracy, which is requested by the position use application for positioning, and is for example, "within 50 meters". For example, if the requested accuracy is "within 50 meters", the positioning processing unit 124 records "1" in the positioning flag of a positioning method that theoretically satisfies the requested accuracy of "within 50 meters", that is to say, the GPS positioning or the WLAN positioning, on the basis of an accuracy condition table T4 stored in the accuracy condition storage unit 129 in order to instruct the GPS positioning unit 121 or the WLAN positioning unit 122 to perform positioning.

The positioning processing unit 124 updates the previous positioning result table T1 stored in the previous positioning result storage unit 126 to a latest positioning result (position information, positioning accuracy, and positioning time), which have been obtained by the individual positioning methods every time any one of GPS positioning, the WLAN positioning, and base station positioning is executed. Accordingly, the previous positioning result table T1 maintains a latest positioning result all the time.

The positioning processing unit 124 selects a positioning method by which maximum positioning accuracy is obtained among the positioning methods executed in response to this trigger every time the position use application issues a positioning request. Further, the positioning processing unit 124 determines the position information and the positioning accuracy by the positioning method by which a maximum positioning accuracy is obtained to be a representative of the mobile terminal 100, that is to say, a position at the time of positioning and an accuracy at the time of positioning. For example, GPS positioning and WLAN positioning are executed in response to the latest positioning request from a position use application. If a positioning method by which the maximum positioning accuracy is obtained is GPS positioning, the position information and the positioning accuracy obtained by the GPS positioning are determined to be the latest position at the time of positioning and accuracy at the time of positioning of the mobile terminal 100.

Every time a positioning request from a position use application is issued, the positioning processing unit 124 updates position at the time of positioning and accuracy at the time of positioning in a previous-positioning-time location table T2 stored in the position at the time of previous positioning storage unit 127 on the basis of the position information and the positioning information obtained by the positioning method performed in response to this. For example, if GPS positioning, WLAN positioning, and base station positioning are performed in response to the latest positioning request from a position use application, among these positioning methods, the position at the time of positioning and the accuracy at the time of positioning in the previous-positioning-time location table T2 are updated using the position information and the positioning accuracy obtained by the positioning method by which the maximum positioning accuracy is obtained as the latest position at the time of positioning and accuracy at the time of positioning of the mobile terminal 100.

The positioning processing unit 124 determines whether each positioning accuracy satisfy the requested accuracy of the position use application on the basis of the positioning accuracy obtained by the GPS positioning unit 121, the WLAN positioning unit 122, and the base station positioning unit 123. If each positioning accuracy does not satisfy the requested accuracy of the position use application, the positioning processing unit 124 instructs positioning execution by the individual positioning methods that satisfy the requested accuracy from the position use application out of the GPS positioning, the WLAN positioning, and the base station positioning. If each positioning accuracy satisfies a requested accuracy from the position use application, the positioning processing unit 124 instructs the displacement check unit 125 to execute "displacement check processing".

The positioning processing unit 124 records "1" in the positioning flag of the positioning method that has to do re-positioning among the positioning methods defined in the positioning execution table Ta in response to an execution request of re-positioning from the displacement check unit 125. The positioning processing unit 124 gives an instruction to execute positioning to any one of the GPS positioning unit 121, the WLAN positioning unit 122, and the base station positioning unit 123.

The positioning processing unit 124 notifies the position use application of the position information obtained by the positioning method by which the maximum positioning accuracy has been obtained as a response to the positioning request among the positioning methods executed in response to the positioning request from the position use application.

Displacement Check Unit 125

The displacement check unit 125 calculates a displacement of the mobile terminal 100 on the basis of the position information obtained in response to a trigger of the latest positioning request from the position use application and the position at the time of positioning for each positioning method recorded in the previous-positioning-time location table T2.

Specifically, the displacement check unit 125 individually calculates difference values between the position information obtained in response to a trigger of the latest positioning request from the position use application, and the position at the time of positioning of GPS positioning, the position at the time of positioning of WLAN positioning, and the position at the time of positioning base station positioning, which are recorded in the previous-positioning-time location table T2, respectively. The displacement check unit 125 determines these difference values to be a "GPS displacement", a "WLAN displacement", and a "base station displacement" of the mobile terminal 100, respectively.

The displacement check unit 125 determines whether re-positioning conditions are met for each positioning method, that is to say, whether the displacement of the mobile terminal 100 exceeds the distance threshold values recorded in a distance threshold value table T3. Specifically, the displacement check unit 125 individually determines whether the GPS displacement, the WLAN displacement, and the base station displacement of the mobile terminal 100 exceed the GPS positioning distance threshold value, the WLAN positioning distance threshold value, and the base station positioning distance threshold value, which are recorded in the distance threshold value table T3, respectively.

If the re-positioning conditions are met, that is to say, if the displacement of the mobile terminal 100 exceeds the distance threshold value, the displacement check unit 125 notifies the positioning processing unit 124 of an execution request of re-positioning by the positioning method by which the displacement of the mobile terminal 100 exceeds the distance threshold value. For example, if the WLAN displacement of the mobile terminal 100 exceeds the WLAN positioning distance threshold value, the displacement check unit 125 notifies the positioning processing unit 124 of an execution request of re-positioning by WLAN positioning.

Previous Positioning Result Storage Unit 126

The previous positioning result storage unit 126 stores the previous positioning result table T1 in which the positioning methods and the individual latest positioning results are tied. The previous positioning result table T1 is updated by the positioning processing unit 124 each time any one of GPS positioning, WLAN positioning, and base station positioning is executed.

Position at the Time of Previous Positioning Storage Unit 127

The position at the time of previous positioning storage unit 127 stores the previous-positioning-time location table T2 in which the positioning methods and the individual latest positions at the time of positioning are tied. The previous-positioning-time location table T2 is updated by the positioning processing unit 124 every time the previous positioning result table T1 is updated.

Distance Threshold Value Storage Unit 128

The distance threshold value storage unit 128 stores the distance threshold value table T3 in which the positioning methods and the individual distance threshold values are tied. The distance threshold value table T3 is, for example, stored inside the mobile terminal 100 in advance, or is obtained from outside the mobile terminal 100. The distance threshold value table T3 is not updated, for example, every time the previous positioning result table T1 is updated by internal processing of the mobile terminal 100.

Accuracy Condition Storage Unit 129

The accuracy condition storage unit 129 stores the accuracy condition table T4 in which the positioning methods and the conditions on the individual positioning accuracy are tied. The accuracy condition table T4 is, for example, stored inside the mobile terminal 100 in advance, or is obtained from outside the mobile terminal 100. The accuracy condition table T4 is not updated, for example, every time the previous positioning result table T1 is updated by internal processing of the mobile terminal 100.

Details of Positioning Processing Unit 124

Figure 4:
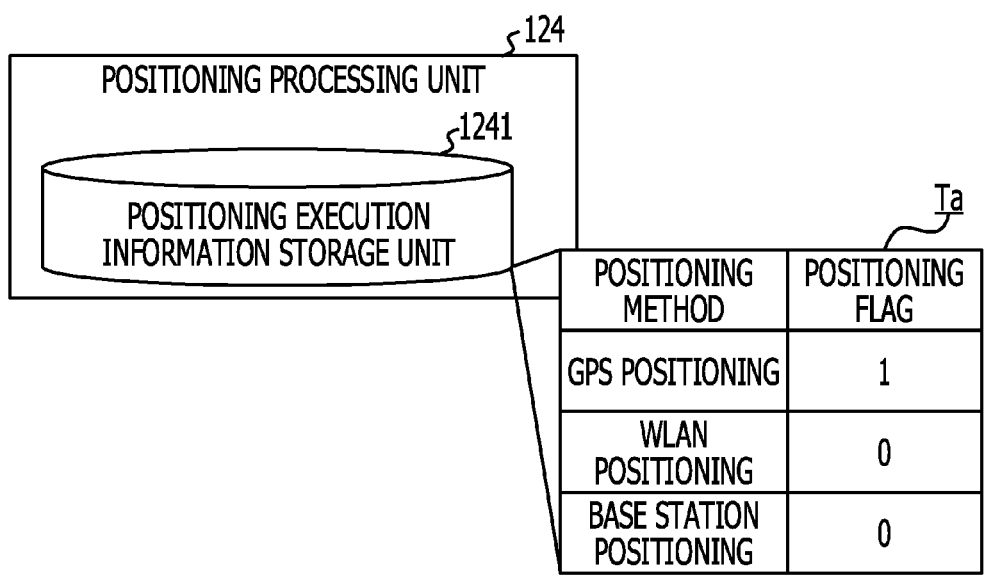
FIG. 4 is a schematic diagram of a positioning processing unit according to the first embodiment.

FIG. 4 is a schematic diagram of the positioning processing unit 124 according to the first embodiment.

As illustrated in FIG. 4, the positioning processing unit 124 includes a positioning execution information storage unit 1241. The positioning execution information storage unit 1241 stores the positioning execution table Ta. The positioning execution table Ta records whether there is a positioning flag for each positioning method or not, that is to say, "1" or "0". The positioning flag of the positioning execution table Ta is updated by the positioning processing unit 124. The positioning processing unit 124 refers to the positioning flag in the positioning execution table Ta, and determines a positioning method by which positioning execution is instructed. For example, if "1" is stored in the positioning flag of the GPS positioning, the positioning processing unit 124 instructs positioning execution by GPS positioning.

Previous Positioning Result Table T1

Figure 5:
FIG. 5 is a schematic diagram of a previous positioning result table according to the first embodiment.

FIG. 5 is a schematic diagram of the previous positioning result table T1 according to the first embodiment.

As illustrated in FIG. 5, the previous positioning result table T1 according to the present embodiment stores a positioning result (positioning time, position information, and positioning accuracy) that is obtained for each positioning method in response to the latest positioning request from the position use application. That is to say, the previous positioning result table T1 stores the latest positioning results (positioning results obtained last) by the individual positioning methods. For example, in the case of GPS positioning, positioning time obtained by the latest GPS positioning is "13:30:00", position information is "north latitude 42°18'32" and east longitude 135°23'31"", and positioning accuracy is "10 m". In this regard, in the case of positioning impossible, "–" is recorded in the position information, and "∞" is recorded in the error range. For example, when GPS positioning is executed indoors, or if WLAN positioning is executed in woods where there is scarcely any access point, positioning impossible often occurs.

Previous-positioning-time Location Table T2

Figure 6:
FIG. 6 is a schematic diagram of a previous positioning time location table according to the first embodiment.

FIG. 6 is a schematic diagram of the previous-positioning-time location table T2 according to the first embodiment.

As illustrated in FIG. 6, the previous-positioning-time location table T2 according to the present embodiment stores the position information and the positioning accuracy of the mobile terminal 100, which have been obtained the position information last time, for each positioning method. In the present embodiment, the position information and the positioning accuracy obtained by the positioning method by which the maximum positioning accuracy has been obtained at the time of obtaining the position information last time are stored in the position at the time of positioning and the accuracy at the time of positioning in the previous-positioning-time location table T2.

For example, when GPS positioning is executed last time, if WLAN positioning is also executed, the position information and the positioning accuracy obtained by the positioning method by which the maximum positioning accuracy is obtained among GPS positioning and WLAN positioning is determined to be a position at the time of positioning and accuracy at the time of positioning of GPS positioning and WLAN positioning.

Accordingly, for example, the position information and the positioning accuracy obtained by WLAN positioning or base station positioning are sometimes recorded in the position at the time of positioning and the accuracy at the time of positioning of GPS positioning in the previous-positioning-time location table T2. In the same manner, for example, the position information and the positioning accuracy obtained by GPS positioning or base station positioning are sometimes recorded in the position at the time of positioning and the accuracy at the time of positioning of WLAN positioning in the previous-positioning-time location table T2.

Distance Threshold Value Table T3

FIG. 7 is a schematic diagram of the distance threshold value table T3 according to the first embodiment.

As illustrated in FIG. 7, the distance threshold value table T3 according to the present embodiment stores a distance threshold value for each positioning method. The distance threshold value is used as a trigger of re-positioning for checking a positioning environment of GPS positioning, WLAN positioning, and base station positioning.

Accuracy Condition Table T4

Figure 8:
FIG. 8 is a schematic diagram of an accuracy condition table according to the first embodiment.

FIG. 8 is a schematic diagram of the accuracy condition table T4 according to the first embodiment.

As illustrated in FIG. 8, the accuracy condition table T4 according to the present embodiment stores, for example, theoretical maximum accuracy for each positioning method as a condition on positioning accuracy. For example, in the case of GPS positioning, it is possible to perform positioning with a maximum positioning accuracy of "5 meters", and thus "5 meters" is recorded in the theoretical maximum accuracy of GPS positioning.

Processing Flow of Positioning Processing Unit 124

Figure 9:
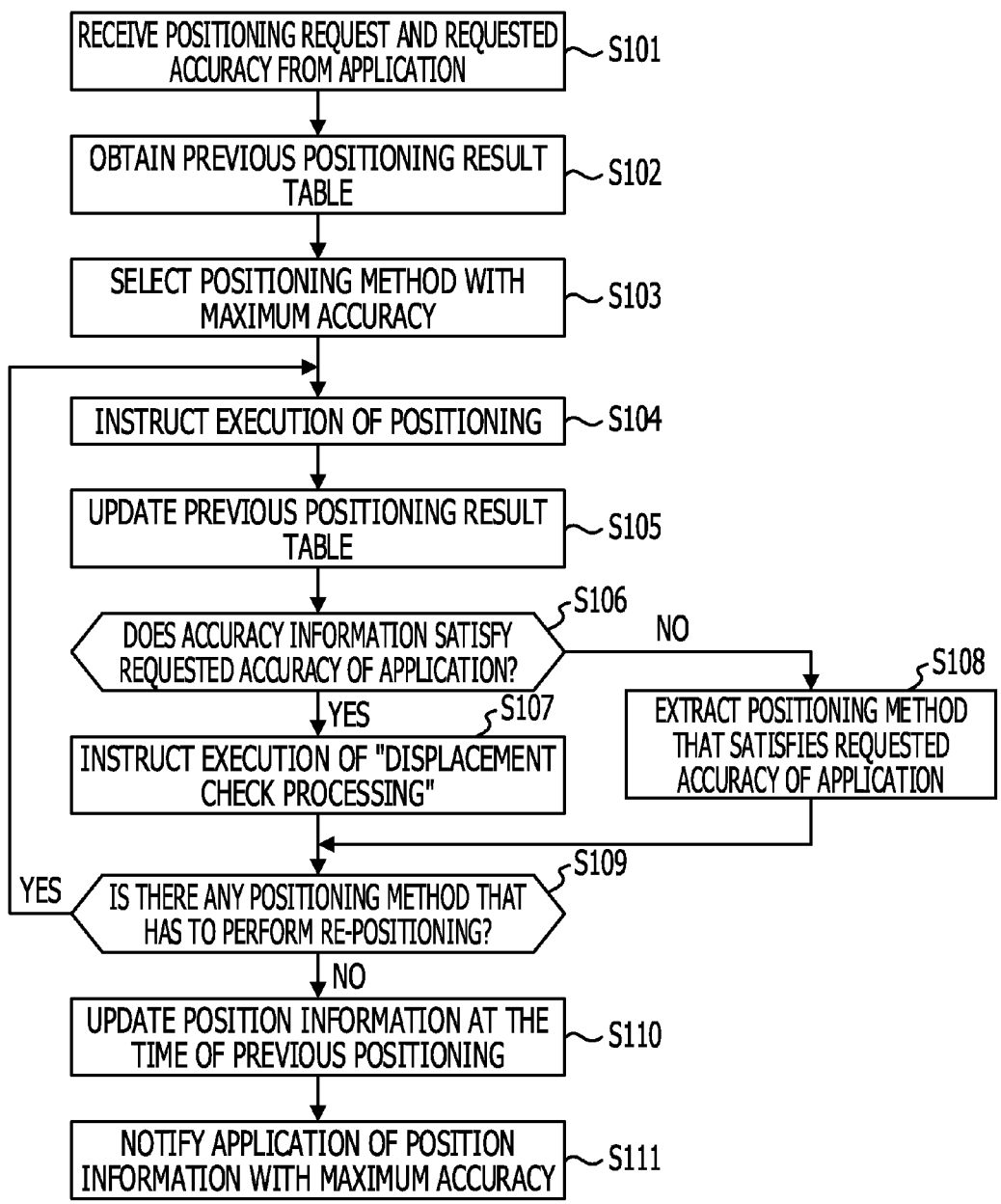
FIG. 9 is a flowchart of processing by the positioning processing unit according to the first embodiment.

FIG. 9 is a flowchart of processing by the positioning processing unit 124 according to the first embodiment.

As illustrated in FIG. 9, first, the positioning processing unit 124 according to the present embodiment receives a positioning request and requested accuracy from a position use application (step S101).

Next, the positioning processing unit 124 obtains the previous positioning result table T1 stored in the previous positioning result storage unit 126 (step S102).

Next, the positioning processing unit 124 refers to the previous positioning result table T1, and selects a positioning method by which a maximum positioning accuracy is recorded (step S103). Further, the positioning processing unit 124 records "1" in the positioning flag of the positioning method by which the maximum positioning accuracy is recorded in the positioning execution table Ta. For example, if a positioning method by which a maximum positioning accuracy is recorded is GPS positioning, the positioning processing unit 124 records "1" in the positioning flag of GPS positioning in the positioning execution table Ta.

Next, the positioning processing unit 124 refers to the positioning execution table Ta, and instructs a positioning method whose positioning flag is set to "1" (step S104). The positioning method whose positioning flag is set to "1" is a positioning method by which the maximum positioning accuracy is recorded among the positioning methods recorded in the previous positioning result table T1. Accordingly, it is thought that a positioning method whose positioning flag is set to "1" is a positioning method that is expected to have the maximum positioning accuracy this time. Accordingly, in the present embodiment, positioning execution is instructed by the positioning method whose positioning flag is set to "1". For example, if a positioning method whose positioning flag is set to "1", that is to say, a selected positioning method is GPS positioning, the positioning processing unit 124 instructs the GPS positioning unit 121 to perform positioning execution, and causes the GPS positioning module 113 to perform GPS positioning. At this time, a positioning method whose positioning flag is not set to "1", that is to say, a positioning method by which the maximum positioning accuracy is not recorded, for example, WLAN positioning and base station positioning, is not executed. In this regard, after instructing positioning execution by a positioning method whose positioning flag is set to "1", the positioning processing unit 124 rewrites the positioning flag from "1" to "0" in the positioning execution table Ta.

Next, the positioning processing unit 124 updates the positioning result (positioning time, position information, and positioning accuracy) recorded in the previous positioning result table T1 to the positioning result (positioning time, position information, and positioning accuracy) obtained by the positioning method executed in response to the latest positioning request from the position use application (step S105). For example, if the positioning method executed in response to the latest positioning request from the position use application is GPS positioning, the positioning processing unit 124 updates the positioning result obtained by the GPS positioning recorded in the previous positioning result table T1 to the latest positioning result by GPS positioning.

Next, the positioning processing unit 124 determines whether or not the positioning accuracy by the positioning method executed in response to the latest positioning request from the position use application satisfies the requested accuracy from the position use application (step S106). For example, if the positioning method executed in response to the latest positioning request from the position use application is GPS positioning, the positioning processing unit 124 determines whether the positioning accuracy by GPS positioning satisfies the requested accuracy from the position use application.

Here, if the positioning method executed in response to the latest positioning request from the position use application satisfies the requested accuracy from the position use application (Yes in step S106), the positioning processing unit 124 instructs the displacement check unit 125 to execute "displacement check processing" (step S107).

The "displacement check processing" is processing to determine whether there is a positioning method that has to check a positioning environment on the basis of the displacement of the mobile terminal 100 and the distance threshold value recorded in the distance threshold value table T3. If there is a positioning method that has to check a positioning environment, the displacement check processing unit 125 extracts the positioning method that has to check a positioning environment as a positioning method that has to do re-positioning. Further, the displacement check unit 125 requests the positioning processing unit 124 to perform positioning execution by the positioning method that has to do re-positioning. The positioning processing unit 124 set "1" in the positioning flag of the positioning method that has to do re-positioning on the basis of a positioning execution request from the displacement check unit 125. Details of the "displacement check processing" will be described later.

On the other hand, if the positioning accuracy by the positioning method executed in response to the latest positioning request from the position use application is determined not to satisfy the requested accuracy from the position use application (No in step S106), the positioning processing unit 124 refers to a theoretical maximum accuracy in the accuracy condition table T4, and extracts the positioning method that theoretically satisfies the requested accuracy from the position use application as a positioning method that has to do re-positioning (step S108). Further, the positioning processing unit 124 set "1" in the positioning flag of the positioning method that has to do re-positioning in the positioning execution table Ta. For example, if a plurality of positioning methods satisfy the requested accuracy from the position use application, the positioning processing unit 124 extracts all of these positioning methods as positioning methods that has to do re-positioning, and sets "1" in the individual positioning flags in the positioning execution table Ta.

Next, the positioning processing unit 124 refers to the positioning execution table Ta, and determines whether there is a positioning method that has to do re-positioning (step S109). Specifically, the positioning processing unit 124 refers to the positioning execution table Ta, and determines whether there is a positioning method whose positioning flag is set to "1".

Here, if determined that there is a positioning method that has to do re-positioning (Yes in step S109), the positioning processing unit 124 instructs the positioning method that has to do re-positioning to perform positioning execution (step S104). For example, if the positioning method that has to do re-positioning is WLAN positioning, the positioning processing unit 124 instructs the WLAN positioning unit 122 to perform positioning execution. Thereby, the WLAN positioning unit 122 controls the WLAN positioning module 114 to perform WLAN positioning.

On the other hand, if not determined that there is a positioning method that has to do re-positioning (No in step S109), the positioning processing unit 124 refers to the previous positioning result table T1, and updates the previous-positioning-time location table T2 (step S110). Specifically, the positioning processing unit 124 updates the position at the time of positioning and the accuracy at the time of positioning of the positioning method executed in response to the latest positioning request from the position use application among the positioning methods recorded in the previous-positioning-time location table T2 to the position information and the positioning accuracy of the positioning method by which the maximum positioning accuracy is obtained among the positioning methods executed in response to the latest positioning request from the position use application. For example, if GPS positioning and WLAN positioning are executed in response to the latest positioning request from the position use application, the positioning processing unit 124 updates the position at the time of positioning and the accuracy at the time of positioning of GPS positioning and WLAN positioning recorded in the previous-positioning-time location table T2 to the positioning method by which the maximum positioning accuracy is obtained among the, that is to say, the position information and the positioning accuracy by GPS positioning or WLAN positioning among the GPS positioning and the WLAN positioning that have been executed in response to the latest positioning request from the position use application.

Next, the positioning processing unit 124 notifies the position use application of the position information obtained by the positioning method by which the maximum positioning accuracy is obtained among the positioning methods executed in response to the latest positioning request from the position use application (step S111). For example, if GPS positioning and WLAN positioning are executed in response to the latest positioning request from the position use application, the positioning processing unit 124 notifies the position use application of the position information obtained by the positioning method by which the maximum positioning accuracy is obtained among GPS positioning and WLAN positioning. By above, the processing flow by the positioning processing unit 124 is terminated.

As described above, the mobile terminal 100 according to the present embodiment obtains position information of the mobile terminal 100 using the positioning method by which the maximum positioning accuracy is recorded in response to the latest positioning request from the position use application among the positioning methods recorded in the previous positioning result table T1. That is to say, the mobile terminal 100 obtains the position information of the mobile terminal 100 using the positioning method by which the maximum positioning accuracy is obtained among the positioning methods executed in response to the previous positioning request from the position use application. On the contrary, the positioning processing unit 124 according to the present embodiment stops obtaining the position information by the positioning method by which the maximum positioning accuracy has not been obtained. Accordingly, the number of the positioning modules operated in response to the positioning request from the position use application is decreased, and thus it is possible to reduce power consumption of the mobile terminal 100. However, as described later, the mobile terminal 100 according to the present embodiment includes the displacement check unit 125 in consideration that the positioning method by which the maximum positioning accuracy is obtained changes with a displacement (location) of the mobile terminal 100.

Processing Flow of Displacement Check Unit 125

Figure 10:
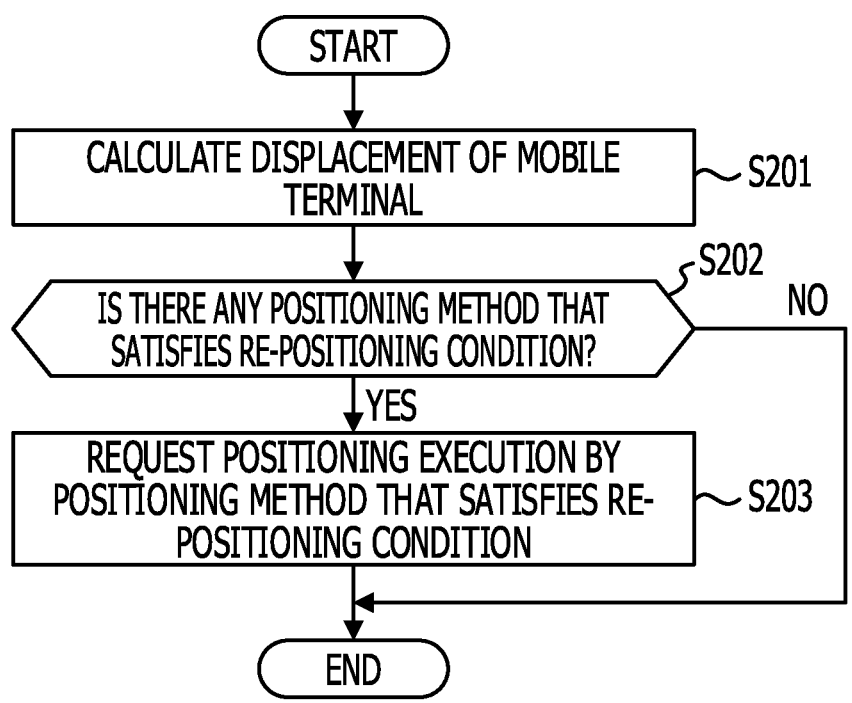
FIG. 10 is a flowchart of processing by a displacement check unit according to the first embodiment.

FIG. 10 is a flowchart of processing by the displacement check unit 125 according to the first embodiment.

As illustrated in FIG. 10, the displacement check unit 125 calculates a displacement of the mobile terminal 100 for each positioning method on the basis of the position information obtained in response to the latest positioning request of the position use application and the position at the time of positioning recorded in the previous-positioning-time location table T2 (step S201).

Specifically, the displacement check unit 125 individually calculates difference values between the position information obtained in response to the latest positioning request from the position use application, and the position at the time of positioning of GPS positioning, the position at the time of positioning of WLAN positioning, and the position at the time of positioning of the base station positioning, which are recorded in the previous-positioning-time location table T2, respectively, and determines these values to be a "GPS displacement", a "WLAN displacement", and a "base station displacement" of the mobile terminal 100.

Next, the displacement check unit 125 refers to a distance threshold value in the distance threshold value table T3, and determines whether there is a positioning method that satisfies the re-positioning condition (step S202). Specifically, the displacement check unit 125 determines whether there is a positioning method by which the displacement of the mobile terminal 100 exceeds the distance threshold value for each positioning method. For example, the displacement check unit 125 determines whether the GPS displacement of the mobile terminal 100 exceeds the GPS positioning distance threshold value "100 meters" recorded in the distance threshold value table T3. In the same manner, the displacement check unit 125 determines whether the WLAN displacement or the base station displacement of the mobile terminal 100 exceeds the WLAN positioning distance threshold value "100 meters" or the base station positioning distance threshold value "500 meters", respectively.

Here, if determined that there is a positioning method that satisfies the re-positioning condition (Yes in step S202), the displacement check unit 125 request the positioning processing unit 124 to perform positioning execution by a positioning method that satisfies the re-positioning condition (step S203). For example, if the WLAN displacement of the mobile terminal 100 exceeds the distance threshold value "100 meters" in the distance threshold value table T3, the displacement check unit 125 requests the positioning processing unit 124 to perform positioning execution by WLAN positioning. Thereby, the positioning processing unit 124 instructs the WLAN positioning unit 122 to perform positioning execution, and causes the WLAN positioning module 113 to execute WLAN positioning.

On the other hand, if not determined that there is a positioning method that satisfies the condition of the re-positioning (No in step S202), the displacement check unit 125 terminates the displacement check processing.

As described above, if the displacement of the mobile terminal 100 from when the position information is obtained last time exceeds the individual distance threshold values, the displacement check processing according to the present embodiment requests the positioning processing unit 124 to perform positioning execution for each positioning method. That is to say, if the mobile terminal 100 has moved a great distance after obtaining the position information last time, it is estimated that positioning environment of the mobile terminal 100 has been changed. For example, it is thought that even when a maximum positioning accuracy is not obtained at the time of obtaining the position information last time, if the mobile terminal 100 moves a great distance, a maximum positioning accuracy may be obtained. Accordingly, in the case where the displacement of the mobile terminal 100 after obtaining the position information last time exceeds the distance threshold value for each positioning method, the position information is obtained once again so that it is checked whether the positioning method itself is best suited or not. In this manner, in the present embodiment, accompanying with a displacement of the mobile terminal 100, re-positioning is executed in order to grasp the positioning environment of the mobile terminal 100. Thus, positioning is performed by an optimum positioning method at individual locations. Accordingly, even if the number of positioning modules that operate in response to a positioning request from a position use application is decreased, it is possible to suppress deterioration of positioning accuracy.

In the present embodiment, a displacement of the mobile terminal 100 is used as a trigger of re-positioning in order to check a positioning environment, and thus as long as the position of the mobile terminal 100 is changed, re-positioning for checking the positioning environment is not executed. Accordingly, compared with a case of using an elapsed time from the most recent positioning as a trigger of re-positioning for checking the positioning environment, it is possible to suppress useless re-positioning.

However, as a trigger of re-positioning for checking the positioning environment, both a displacement of the mobile terminal 100 and an elapsed time from when obtaining the position information last time may be employed. In consideration of not only a displacement, but also an elapsed time, even if a change arises in the positioning environment because of weather changes and surrounding environment changes, it becomes possible to execute positioning by an optimum positioning method at each position and time.

In this regard, the displacement check unit 125 according to the present embodiment individually calculates difference values between the position information obtained in response to the latest positioning request from the position use application, and the position at the time of positioning by GPS positioning, the position at the time of positioning by WLAN positioning, and the position at the time of positioning by the base station positioning, which are recorded in the previous-positioning-time location table T2, respectively, and determines these values to be a "GPS displacement", a "WLAN displacement", and a "base station displacement" of the mobile terminal 100.

However, the present disclosure is not limited to this. For example, in order to calculate a "GPS displacement", a "WLAN displacement", and a "base station displacement", a displacement on a moving path (movement locus) of the mobile terminal 100 may be calculated using the position information obtained until the position use application issues the latest positioning request after updating the position at the time of positioning in the previous-positioning-time location table T2.

In this regard, in the above embodiment, three positioning methods, which are GPS positioning, WLAN positioning, and base station positioning, are exemplified as a plurality of positioning methods. However, the present disclosure is not limited to this. The number and the kinds of positioning methods are not fixed.

Also, in the above embodiment, positioning execution is performed by a positioning method that satisfies the re-positioning condition on the basis of a displacement of the mobile terminal 100. However, for example, the other parameters on a change in positioning environment (radio environment) may be incorporated.

Second Embodiment

In the following, a description will be given of a second embodiment with reference to FIG. 11 to FIG. 16. Note that descriptions of the same configuration and operation as those of the first embodiment will be omitted.

Functional Blocks of Mobile Terminal 100A

Figure 11:
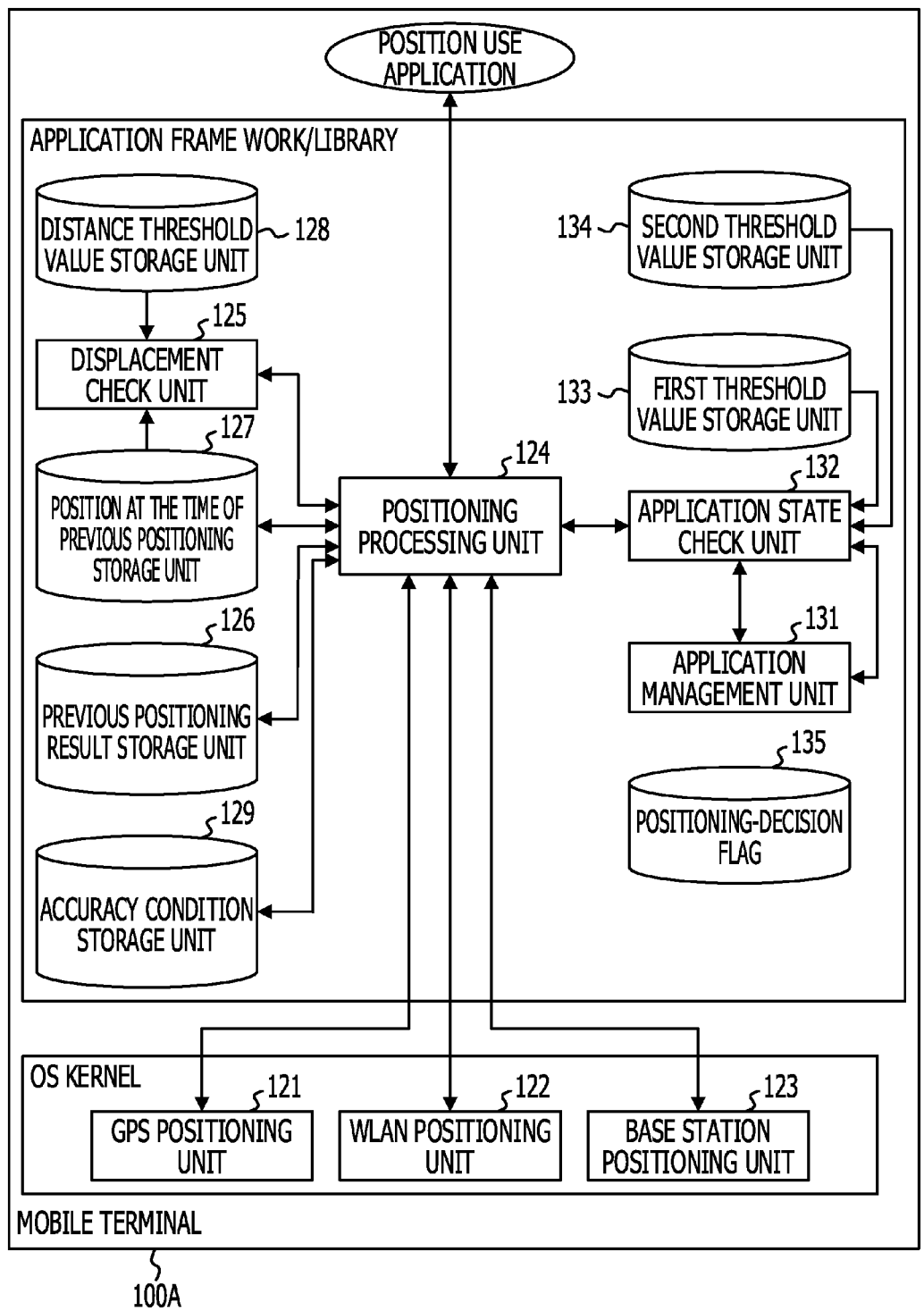
FIG. 11 is a schematic diagram of functional blocks of a mobile terminal according to a second embodiment.

FIG. 11 is a schematic diagram of functional blocks of a mobile terminal 100A according to a second embodiment.

As illustrated in FIG. 11, the mobile terminal 100 according to the present embodiment further includes an application management unit 131, an application state check unit 132, an application threshold value table storage unit 133, and a positioning method specific threshold value table storage unit 134.

All of the application management unit 131, the application state check unit 132, the application threshold value table storage unit 133, and the positioning method specific threshold value table storage unit 134 are achieved when the CPU 101 transfers the control program to the main memory 102, and the control program that has been read in the main memory 102 is executed.

Application Management Unit 131

The application management unit 131 notifies the application state check unit 132 of a name and a use state of a position use application of a positioning request issue source on the basis of a request from the application state check unit 132. As the use state of the position use application, definitions are given to a foreground state, in which a content is displayed on a front face of the display 111, and a user is allowed to actually perform screen operation, and a background state, in which the content is not displayed on the front face of the display 111, and the user is not allowed to actually perform screen operation.

Application State Check Unit 132

The application state check unit 132 requests the name and the use state of the position use application of the positioning request issue source from the application management unit 131 in response to a positioning request from the position use application. Further, the application state check unit 132 determines whether there is the name of the position use application of the positioning request issue source in an application threshold value table T5.

The application state check unit 132 obtains a time threshold value from the application threshold value table T5 or a positioning method specific threshold value table T6, and determines whether an elapsed time from the most recent positioning time by the selected positioning method exceeds the time threshold value or not.

If the elapsed time from the most recent positioning time by the selected positioning method exceeds the time threshold value, the application state check unit 132 sets "1" in the positioning flag of a positioning decision table Tb.

Details of Application State Check Unit 132

Figure 12:
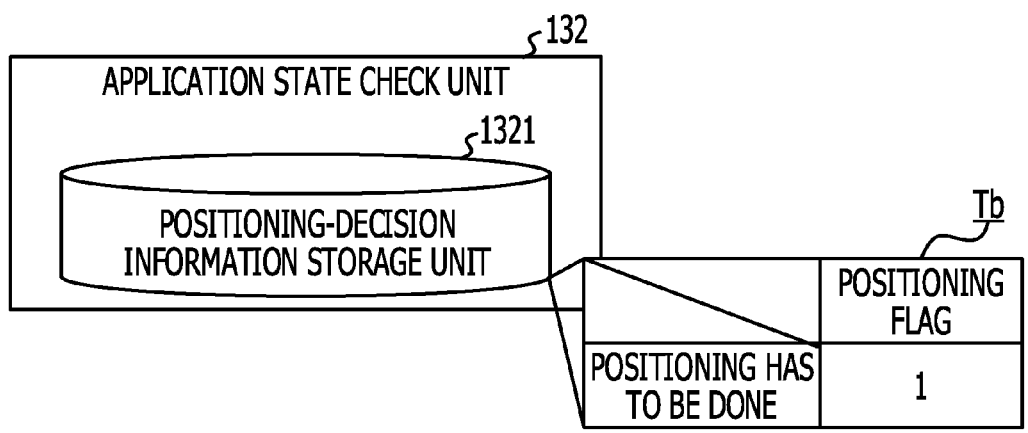
FIG. 12 is a schematic diagram of an application state check unit according to the second embodiment.

FIG. 12 is a schematic diagram of the application state check unit 132 according to the second embodiment.

As illustrated in FIG. 12, the application state check unit 132 includes a positioning-decision information storage unit 1321. The positioning-decision information storage unit 1321 stores the positioning decision table Tb. The positioning decision table Tb stores a state of the positioning flag, that is to say, "1" or "0" for each position use application. The positioning flag of the positioning decision table Tb is updated by the application state check unit 132. When a position use application issues a positioning request, the positioning processing unit 124 refers to the positioning flag of the positioning decision table Tb, and determines whether to actually perform positioning or not. That is to say, even when a position use application issues a positioning request, if "0" is stored in the positioning flag of the positioning decision table Tb, the positioning processing unit 124 does not obtain the position information.

Application Threshold Value Table T5

Figure 13:
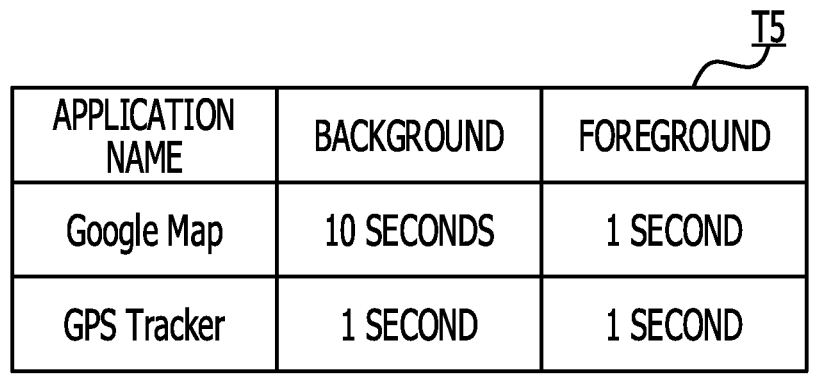
FIG. 13 is a schematic diagram of an application specific threshold value table according to the second embodiment.

FIG. 13 is a schematic diagram of the application threshold value table T5 according to the second embodiment.

As illustrated in FIG. 13, in the application threshold value table T5 according to the present embodiment, a position use application is tied to a time threshold value for each use state of a position use application. For example, if a position use application is "Google Map", and the use state of the position use application is background, "10 seconds" is assigned to the time threshold value. The time threshold value is used for determining whether positioning has to be performed or not by each positioning method when a position use application issues a positioning request.

Positioning Method Specific Threshold Value Table T6

Figure 14:
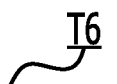
FIG. 14 is a schematic diagram of a positioning method specific threshold value table according to the second embodiment.

FIG. 14 is a schematic diagram of the positioning method specific threshold value table T6 according to the second embodiment.

As illustrated in FIG. 14, in the positioning method specific threshold value table T6 according to the present embodiment, a positioning method is tied to a time threshold value for each use state of a position use application. For example, if the selected positioning method is GPS positioning, and the use state of the position use application is background, "5 seconds" is assigned to the time threshold value. The time threshold value is used for determining whether positioning has to be performed or not by each positioning method when a position use application issues a positioning request.

Processing Flow of Positioning Processing Unit 124

Figure 15:
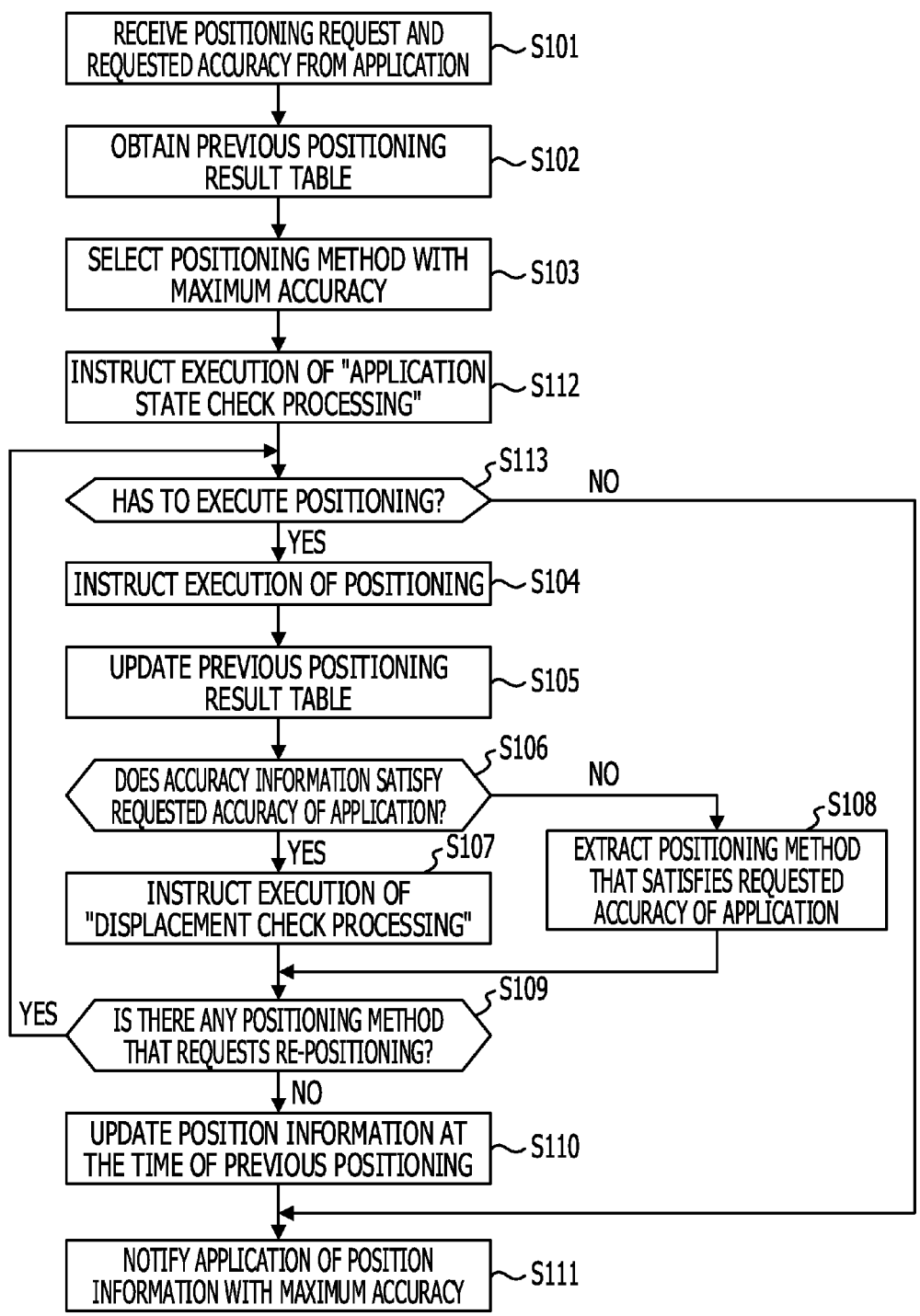
FIG. 15 is a flowchart of processing by a positioning processing unit according to the second embodiment.

FIG. 15 is a flowchart of processing by positioning processing unit 124 according to the second embodiment.

As illustrated in FIG. 15, when the positioning processing unit 124 according to the present embodiment selects the positioning method in which the maximum positioning accuracy is recorded (step S103), the positioning processing unit 124 instructs the application state check unit 132 to perform "application state check processing" (step S112).

The "application state check processing" is processing for determining whether to actually perform positioning or not for each positioning request from a position use application. If determined to actually perform positioning, the application state check unit 132 sets "1" in the positioning flag of the positioning decision table Tb stored in the positioning-decision information storage unit 1321. Details of the "application state check processing" will be described later.

Next, the positioning processing unit 124 refers to the positioning flag of the positioning decision table Tb, and determines whether positioning has actually to be performed (step S113). Specifically, the positioning processing unit 124 checks whether "1" is recorded in the positioning flag of the positioning decision table Tb.

Here, if determined that positioning has actually to be performed (Yes in step S113), that is to say, if checked that "1" is recorded in the positioning flag of the positioning decision table Tb, the positioning processing unit 124 refers to the positioning execution table Ta, and instructs the positioning method whose positioning flag is set to "1", that is to say, instructs to perform positioning execution by the positioning method by which the maximum positioning accuracy is recorded (step S104).

On the other hand, if not determined that positioning has actually to be performed (No in step S113), the positioning processing unit 124 extracts position information by the positioning method by which "1" is set in the positioning flag of the positioning execution table Ta, that is to say, the selected positioning method from the previous positioning result table T1, and notify the position use application of the position information (step S111).

Processing Flow of Application State Check Unit 132

Figure 16:
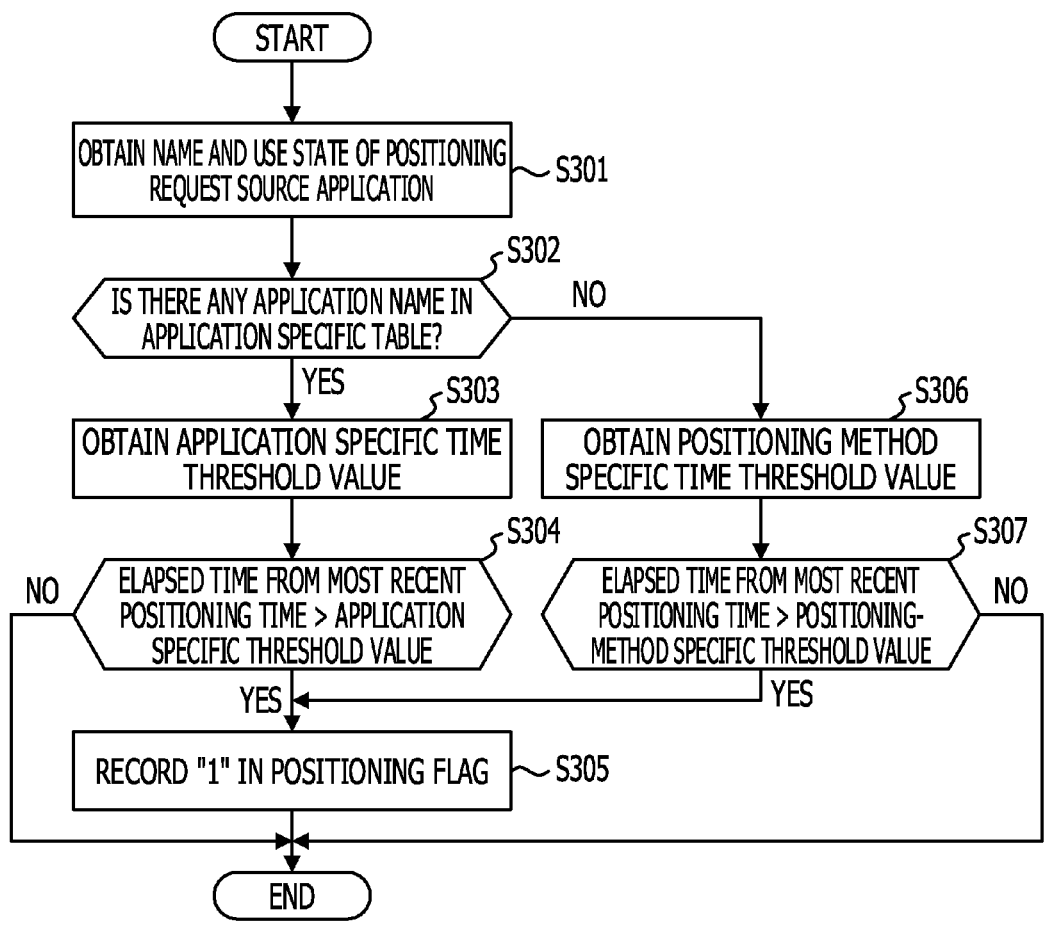
FIG. 16 is a flowchart of processing by the application state check unit according to the second embodiment.

FIG. 16 is a flowchart of processing by the application state check unit 132 according to the second embodiment.

As illustrated in FIG. 16, the application state check unit 132 according to the present embodiment first obtains a name and a use state of a position use application of a positioning request issue source from the application management unit 131 on the basis of an instruction from the positioning processing unit 124 (step S301).

Next, the application state check unit 132 determines whether the application threshold value table T5 stored in the application threshold value table storage unit 133 includes the name of the application obtained from the application management unit 131 (step S302).

Here, if determined that the application threshold value table T5 includes the name of the position use application (Yes in step S302), the application state check unit 132 refers to the application threshold value table T5, and obtains the name of the position use application and the time threshold value tied to the use state (step S303). For example, if the position use application is "Google Map", and the use state is background state, the application state check unit 132 obtains "10 seconds" as the time threshold value.

Next, the application state check unit 132 determines whether the elapsed time from the most recent positioning time by the selected positioning method exceeds the time threshold value tied to the name of the position use application and the use state (step S304).

Here, if determined that the elapsed time from the most recent positioning time by the selected positioning method exceeds the time threshold value (Yes in step S304), the application state check unit 132 sets "1" in the positioning flag of the positioning decision table Tb (step S305). Thereby, the positioning processing unit 124 refers to the positioning flag of the positioning decision table Tb, and determines whether positioning has actually to be performed or not.

On the other hand, if not determined that the elapsed time from the most recent positioning time by the selected positioning method exceeds the time threshold value (No in step S304), the application state check unit 132 terminates the application state check processing.

Also, if not determined that the application threshold value table T5 includes the name of the position use application (No in step S302), the application state check unit 132 refers to the positioning method specific threshold value table T6, and obtains the selected positioning method and time threshold value tied to the use state of the application (step 306). For example, if the selected positioning method is GPS positioning and the use state of the application is foreground, the application state check unit 132 obtains "1 second" as the time threshold value.

Next, the application state check unit 132 determines whether the elapsed time from the most recent positioning time by the selected positioning method exceeds the time threshold value tied to the selected positioning method and the use state of the application (step S307).

Here, if determined that the elapsed time from the most recent positioning time by the selected positioning method exceeds the time threshold value (Yes in step S307), the application state check unit 132 sets "1" in the positioning flag of the positioning decision table Tb (step S305). Thereby, the positioning processing unit 124 refers to the positioning flag of the positioning decision table Tb, and determines whether positioning has actually to be performed or not.

On the other hand, if not determined that the elapsed time from the most recent positioning time by the selected positioning method exceeds the time threshold value (No in step S307), the application state check unit 132 terminates the application state check processing.

By the present embodiment, if the elapsed time from the most recent positioning time by the selected positioning method does not exceed the time threshold value determined for each position use application or for each positioning method, the position information obtained at the most recent positioning time is obtained from the previous positioning result table T1 and is returned to the position use application of the positioning request issue source. That is to say, if it is possible to estimate that the position information obtained at the most recent positioning time is valid, even if a position use application issues a positioning request, positioning is omitted, and the position information recorded in the previous positioning result table T1 is returned to the position use application of the positioning request issue source. Thereby, it is possible to save electric power of the mobile terminal 100 without deteriorating positioning accuracy.

Moreover a determination is made of whether to perform positioning by the selected positioning method using the time threshold value determined for each position use application and use state or the time threshold value determined for each positioning method and use state. Accordingly, positioning is performed at an adequate positioning frequency regardless of a positioning request from a position use application, and thus it is possible to reduce power consumption of the mobile terminal 100

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of positioning a mobile apparatus, the mobile apparatus being configured to perform a plurality of methods for acquiring information indicating a current position of the mobile apparatus, the method comprising:

acquiring, by a processor in the mobile apparatus, in accordance with a request for acquiring position information, position information regarding one of first and second past accuracy information from a memory configured to store therein the first past accuracy information including first position information and the second past accuracy information including second position information, the first past accuracy information being acquired using a first method among the plurality of methods regarding acquisition of position information at the first position, the second past accuracy information being acquired using a second method among the plurality of methods regarding acquisition of position information at the second position;

determining, by the processor, whether displacement between position corresponding to acquired position information and current position of the mobile apparatus exceeds a predetermined distance;

selecting, by the processor, when it is determined that the displacement does not exceed the predetermined distance, one of the first and second methods, corresponding to one of the first and second past accuracy information indicating higher accuracy; and selecting, by the processor, when it is determined that the displacement exceeds the predetermined distance, one of the first and second methods by
obtaining first accuracy information on acquisition of position information using the first method,
obtaining second accuracy information on acquisition of position information using the second method, and
specifying one of the obtained first accuracy information and the second accuracy information indicating higher accuracy.

2. The method according to claim 1,
wherein the displacement is measured from the position corresponding to acquired position information and current position of the mobile terminal acquired by one of the first and second methods selected based on one of the first and second past accuracy information indicating higher accuracy.

3. The method according to claim 1, further comprising:
acquiring, by the processor, current position information of the mobile terminal by one of the first and second methods selected based on one of the first and second past accuracy information indicating higher accuracy; and
calculating the displacement based on the acquired current position information and the position information acquired with one of the first and second past accuracy information.

4. The method according to claim 1,
wherein
the predetermined distance including first predetermined distance corresponding to the first method and second predetermined distance corresponding to the second method, and
the determining includes comparing the displacement with one of the first and second predetermined distance corresponding to the acquired position information of one of the first and second past accuracy information.

5. The method according to claim 1, further comprising:
specifying an operation state of an application program that issues a first positioning request; and
obtaining the position information using the first method at an interval corresponding to the operation state.

6. The method according to claim 5, further comprising
returning to the application program position information obtained in response to a second positioning request that is issued by the application program previous to the first positioning request when an elapsed time from the second positioning request is less than the interval.

7. The method according to claim 5,
wherein the obtaining includes obtaining the position information using the first method at the interval corresponding to the operation state and the application program.

8. The method according to claim 7, further comprising
returning to the application program position information obtained in response to a second positioning request that is issued by the application program previous to the first positioning request when an elapsed time from the second positioning request is less than the interval.

9. The method according to claim 5,
wherein the operation state is a foreground state in which an execution result of the application program is displayed or a background state different from the foreground state.

10. The method according to claim 1, further comprising:
acquiring, by the processor, current accuracy information by one of the first and second methods corresponding to one of the first and second past accuracy information indicating higher accuracy information; and
determining, by the processor, whether the acquired current accuracy information satisfy required accuracy of the request for acquiring position information.

11. The method according to claim 10, wherein
selecting, by the processor, one of the first and second methods corresponding to one of the first and second past accuracy information indicating higher accuracy when the acquired current accuracy information satisfy the required accuracy and the displacement is determined not to exceed the predetermined distance.

12. The method according to claim 10, wherein
when it is determined that the acquired current accuracy information does not satisfy the required accuracy, selecting, by the processor one of the first and second methods by
obtaining first accuracy information on acquisition of position information using the first method,
obtaining second accuracy information on acquisition of position information using the second method, and
specifying one of the first and second methods based on one of the acquired first accuracy information and the second accuracy information indicating higher accuracy.

13. A non-transitory computer-readable recording medium for storing a control program of a mobile apparatus which is configured to perform a plurality of methods for acquiring information indicating a current position of the mobile apparatus, the control program causes the mobile apparatus to execute a process comprising:
acquiring, in accordance with a request for acquiring position information, position information regarding one of first and second past accuracy information from a memory configured to store therein the first past accuracy information including first position information and the second past accuracy information including second position information, the first past accuracy information being acquired using a first method among the plurality of methods regarding acquisition of position information at the first position, the second past accuracy information being acquired using a second method among the plurality of methods regarding acquisition of position information at the second position;
determining whether displacement between position corresponding to acquired position information and current position of the mobile apparatus exceeds a predetermined distance;
selecting when it is determined that the displacement does not exceed the predetermined distance, one of the first and second methods, corresponding to one of the first and second past accuracy information indicating higher accuracy; and
selecting, when it is determined that the displacement exceeds the predetermined distance, one of the first and second methods by
obtaining first accuracy information on acquisition of position information using the first method,
obtaining second accuracy information on acquisition of position information using the second method, and
specifying one of the obtained first accuracy information and the second accuracy information indicating higher accuracy.

14. A mobile terminal comprising:
a memory configured to store therein first past accuracy information including first position information and second past accuracy information including second position information, the first past accuracy information being acquired using a first method among a plurality of methods regarding acquisition of position information at the first position, the second past accuracy information being acquired using a second method among the plurality of methods regarding acquisition of position information at the second position; and
a processor coupled to the memory, wherein the processor configured to:
acquire, in accordance with a request for acquiring position information, position information regarding one of the first and second past accuracy information indicating higher accuracy information;

determine whether displacement between position corresponding to acquired position information and current position of the mobile terminal exceeds a predetermined distance;

select, when it is determined that the displacement does not exceed the predetermined distance, one of the first and second methods, corresponding to one of the first and second past accuracy information indicating higher accuracy; and select, when it is determined that the displacement exceeds the predetermined distance, one of the first and second methods by obtaining first accuracy information on acquisition of position information using the first method, obtaining second accuracy information on acquisition of position information using the second method, and specifying one of the obtained first accuracy information and the second accuracy information indicating higher accuracy.

* * * * *